US007461951B2

(12) United States Patent
Chou et al.

(10) Patent No.: US 7,461,951 B2
(45) Date of Patent: Dec. 9, 2008

(54) ILLUMINATION MODULE

(75) Inventors: Ming-Chieh Chou, Tainan (TW); Wen-Shan Lin, Kaohsiung (TW); Yii-Tay Chiou, Kaohsiung (TW); Chun-Hsun Chu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/340,668

(22) Filed: Jan. 27, 2006

(65) Prior Publication Data

US 2007/0115656 A1 May 24, 2007

(30) Foreign Application Priority Data

Nov. 24, 2005 (TW) .............................. 94141225 A

(51) Int. Cl.
*F21V 29/00* (2006.01)
*B60Q 1/00* (2006.01)

(52) U.S. Cl. ....................... 362/294; 362/373; 362/514; 362/547; 362/227

(58) Field of Classification Search ................. 362/227, 362/507, 514, 516, 373, 547, 294, 249, 252, 362/545; 361/697, 702, 709–710
See application file for complete search history.

(56) References Cited

U.S. PATENT DOCUMENTS

| | | | | |
|---|---|---|---|---|
| 5,838,247 | A * | 11/1998 | Bladowski | 340/815.45 |
| 2004/0085779 | A1* | 5/2004 | Pond et al. | 362/516 |
| 2004/0113549 | A1* | 6/2004 | Roberts et al. | 313/512 |
| 2006/0001384 | A1* | 1/2006 | Tain et al. | 315/246 |

FOREIGN PATENT DOCUMENTS

| | | |
|---|---|---|
| CN | M248962 | 11/2004 |
| CN | M251074 | 11/2004 |
| CN | I225713 | 12/2004 |

* cited by examiner

*Primary Examiner*—Sharon E Payne
*Assistant Examiner*—Sean P Gramling
(74) *Attorney, Agent, or Firm*—WPAT. P.C.; Justin King

(57) ABSTRACT

An illumination module is disclosed, which is comprised of a plurality of light sources, a plurality of light source substrates of high thermal conductivity, and a reflecting member for reflecting light. The plural light source substrates are arranged at positions corresponding to each other so as to form a polygon periphery of the illumination module, whereas the inner surface of the polygon periphery is enabled for at least one of the plural light sources to fit therein. The reflecting member is placed at the center of the module where it is corresponding to each of the plural light source substrates so as to reflect the light emitting from the light sources fitted thereon. In addition, a lens with light refraction ability is disposed at the light emitting end of the illumination module so as to enable the light illumination module to have light condensing/diffusing capability. Moreover, each light source substrate further comprises: a plurality of heat dissipating fins, being arranged at the outer surface thereof; and a assistant heat dissipating device; wherein the working range of the operation power and the luminous flux of the illumination module can be increased by the combined function provided by the heat dissipating fins and the assistant heat dissipating device. The assistant heat dissipating device can further comprise: a fan, being arranged at the bottom of the illumination module; and a heat pipe device, being fitted onto the light source substrate, for conducting waste heat to the heat dissipating fins to be dissipated.

13 Claims, 6 Drawing Sheets

ILLUMINATION MODULE

FIELD OF THE INVENTION

The present invention relates to an illumination module, and more particularly, to a high power light emitting diode illumination module having a plurality of light sources to be fitted in the periphery of the illumination module surrounding a reflecting member, which is opposite to those conventional illumination modules with light sources being arranged in the middle thereof while being surrounded by reflectors.

BACKGROUND OF THE INVENTION

Light emitting diodes (LEDs) are semiconductor chips that convert electrical energy directly into light, which use much less power and last much longer than incandescent lights. Since LEDs are efficient, give off little heat, and can be embedded in plastic and other durable materials, they are becoming more and more popular and may be used increasingly in the future not only for a wide range of signal and sign applications, but also for illumination applications. Early versions of LED technology had very low light output and were used primarily for indicator lights on electronic equipment. During the 1990s, however, industry developed brighter LEDs that are suitable for use in traffic and railroad signals, exit signs, and automobile turn and brake signals. Especially, after a first white LED has been developed at 1996 by coating a yellowish phosphor on a blue LED, LED lighting is gradually making great strides in power and efficiency and will play a more major role in general lighting. That is, LEDs are bundled together to provide adequate illumination and being used as the illumination module for applications, such as projectors, LCD-TV backlight modules, automobile head lights, and so on. However, there are still shortcomings preventing LED lighting from being commercially popularized, that the shortcoming includes insufficient luminous efficacy, difficult to dissipate heat and high cost, etc. Take the application of using LED module as automobile head light for example, although it is an appearing idea with great potential, currently LED head lights are only realized for those future car being demonstrated at auto shows. Until recently, though, the price of an LED lighting system was too high for most residential use. Nevertheless, with sales rising and more relating patents to be authorized, the price of high power LED illumination module is steadily decreasing. Therefore, for enabling the LED illumination module to be popularized, the problems, such as insufficient luminous efficacy and difficult to dissipate heat, must be resolved.

Most LED illumination modules bundle and package an array of serial/parallel-connected LEDs for satisfying the luminous flux required to form a high brightness LED illumination module. However, an LED illumination module with high luminous flux output usually accompany with high power requirement that is going to cause the LED illumination module to operate in a high temperature ambient while the exhaust heat can not be effectively discharged from the LED chip. If an LED illumination module is constantly operating in an environment of 120° C. or higher, the life span and luminous efficacy will be severely affected. Conventionally, the heat dissipating problem is solved by means similarly to those used for dissipating heat from center process unit (CPU), which includes the addition of heat dissipating fins, fans, or water-cooling system, etc., on the LED illumination module. But the additional cooling device will affect the structural simplicity and reliability of the LED illumination module, and more particularly, it will increase the cost of the LED illumination module.

In order to adapt LED illumination module to be used as light source of high brightness for projector or automobile, not only the brightness of LED illumination module must be increased, but also the overall volume of the LED illumination module must be reduced while increasing the luminous flux per unit light-emitting areas. Taking auto lamp for instance, a high intensity discharge (HID) head lamp three times as bright as a common halogen lamp, which is multiple times brighter than an LED can provide. Therefore, an LED illumination module, being adapted as auto lamp, must have a plurality of LEDs arranged therein so as to provide enough brightness equal to that of an HID head lamp. However, as the number of LEDs in a auto lamp increases, the size of the auto lamp must increase as well. According to an estimation made by auto lamp industry, there may be still five to ten years or longer before LED illumination modules can be used as head lamps. Hence, a compact, high brightness LED illumination module with high luminous flux per unit light-emitting area is desired.

Please refer to FIG. 1, which is a schematic view of a conventional high power LED projection lamp disclosed in T.W. Pat. No. M251074. The lamp 110 of FIG. 1 is mainly comprised of: a cup-like screen 111 made of conductive metal, having a connecting part with axially-bored hole 112 formed at the shrunken end of the screen, the screen further comprising a reflecting surface 113, disposed on the inner surface thereof, and a plurality of heat dissipating fins 114, formed on the exterior of the same; a base 120 with a plurality of metal legs; and a chip set 130, further comprising a plurality of LEDs. The lamp 110 of FIG. 1 is characterized in that the cup-like screen 110 is designed with function of light reflecting and heat dissipating, especially that the plural fins 114 added on the screen 111 can greatly increase the area of heat dissipation, and thus solve the heat dissipation problem troubling the conventional LED illumination modules. However, since the chip set 130 is limited to be disposed only on a planar surface, the amount of LEDs in the chip set 130 is limited and thus the luminous flux per unit light-emitting area can not be increased as require. Moreover, the arrangement of the plural heat dissipating fins 114 on the screen 111 will cause the overall volume of the lamp 110 to increase so that the dimensions of the lamp can not be reduced at will.

Please refer to FIG. 2, which is a schematic view of another conventional LED luminaire disclosed in T.W. Pat. No. I225713. The LED luminaire of FIG. 2 is substantially an integrated structure of an LED luminaire 23 and a heat pipe device. The heat pipe device is comprised of: an evaporator 236, having a volatile liquid received therein; and a condenser 237 with preferred thermal conductivity, connected and channeled to the evaporator 236. The LED luminaire 23 is comprised of: a base 230 having a plurality of LEDs 232 arranged therein; and a screen 234. Wherein, the evaporator 236 is connected to the base 230 while the condenser 237 is connected to the screen 234 so that the heat generated by the plural LEDs 232 can be transferred to the screen 234 by the cooperative operation of the evaporator 236 and the condenser 237, where the heat is distributed uniformly on the screen 234 and then to be discharged. As seen in FIG. 2, the stereo-designed base 230 arranged in the middle of the luminaire 23 allows the number of LEDs disposed therein to be increased at will, however, the vertically disposed LEDs 232 will cause the beams emitted thereby to be reflected by undesired angles that the luminous efficacy of the LED luminaire 23 is adversely affected. In addition, the heat pipe device adopted by the LED luminaire 23 will cause the fabrication cost of the same to increase.

Please refer to FIG. 3, which is a schematic view of yet another conventional LED luminaire disclosed in T.W. Pat. No. M248962. The LED luminaire 310 of FIG. 3 is composed of a plurality of light fixtures 311, each light fixture 311 further comprising a light collimating part 312 and a position part 313 having at least a substrate 330 fitted thereon for enabling a plurality of LEDs 331 to be fitted thereon; wherein the light collimating part 312 is disposed to reflect the light beams emitted from the plural LEDs 331 so as to enable the luminaire 310 to have comparatively better luminous efficacy. By the arrangement of the plural substrates 330, the number of LEDs to be arranged in the luminaire 310 can be increased at will and thus the luminous flux of the same is increased. However, the area of the luminaire 310 that can be used for heat dissipation is limited since the design of the luminaire 310 causes the heat generated thereby to be dissipated inwardly. Therefore, the working range of the operation power of the luminaire 310 is reduced.

From the above description, the shortcomings of those conventional LED illumination modules can be summed up as following:

(1) A single light-emitting surface limits the amount of LEDs to be disposed thereon that consequently limits the amount of luminous flux per unit light emitting area to be outputted.

(2) As the LEDs are concentrated on a single light-emitting surface, it is difficult to dissipate the exhaust heat generated thereby such that cause the LED illumination module to have poor heat dissipating efficiency.

(3) Most conventional LED illumination modules require addition heat dissipating device for dissipating exhaust heat, such as a heat pipe device. However, the addition of the heat pipe device generally will result the manufacturing cost of the LED illumination module to increase.

(4) Although the amount of LEDs fitted in an LED illumination module can be increased by arranging a plurality of outward-facing substrates for fitting LEDS thereon, the area of the LED illumination module that can be used for heat dissipation is reduced since the design will cause the heat generated thereby to be dissipated inwardly.

SUMMARY OF THE INVENTION

In view of the disadvantages of prior art, the primary object of the present invention is to provide an illumination module having a plurality of light sources to be fitted in the periphery of the illumination module surrounding a reflecting member, which is opposite to those conventional illumination modules with light sources being arranged in the middle thereof while being surrounded by reflectors. Moreover, by using an optic software to calculate and obtain a specific angle for positioning the reflecting surface of the reflector and its corresponding substrate of light source, not only the luminous flux per unit light emitting area is increased as the overall volume of the illumination module is reduced, but also the area of the illumination module that can be used for heat dissipation is increased for enabling the illumination module to be miniaturized and adapted for high power illumination.

To achieve the above object, the present invention provides an illumination module, which is comprised of is comprised of a plurality of light sources, a plurality of light source substrates of high thermal conductivity, and a reflecting member for reflecting light. The plural light source substrates are arranged at positions corresponding to each other so as to form a polygon periphery of the illumination module, whereas the inner surface of the polygon periphery is enabled for at least one of the plural light sources to fit therein. The reflecting member is placed at the center of the module where it is corresponding to each of the plural light source substrates so as to reflect the light emitting from the light sources fitted thereon. In addition, a lens with light refraction ability is disposed at the light emitting end of the illumination module so as to enable the light illumination module to have light condensing/diffusing capability. Moreover, each light source substrate further comprises: a plurality of heat dissipating fins, being arranged at the outer surface thereof; and a assistant heat dissipating device; wherein the working range of the operation power and the luminous flux of the illumination module can be increased by the combined function provided by the heat dissipating fins and the assistant heat dissipating device. The assistant heat dissipating device can further comprise: a fan, being arranged at the bottom of the illumination module; and a heat pipe device, being fitted onto the light source substrate, for conducting waste heat to the heat dissipating fins to be dissipated.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 4:
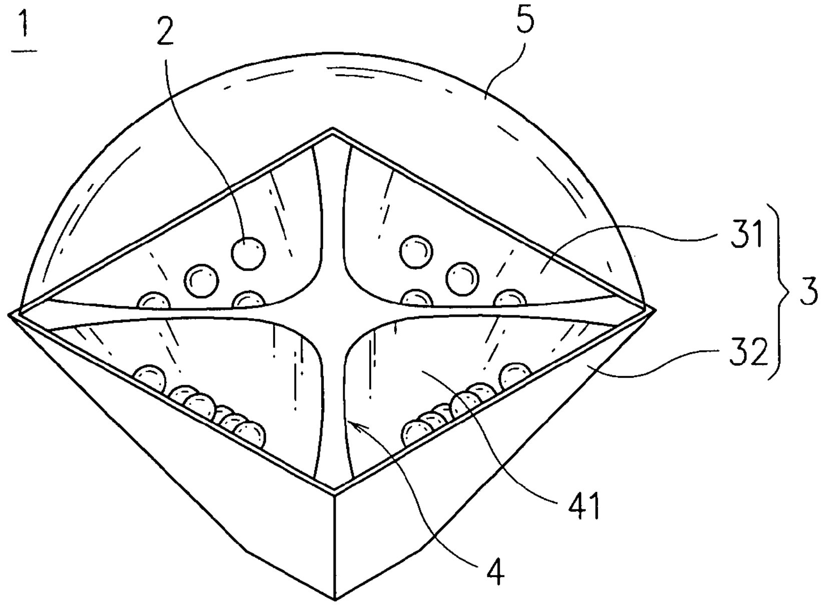
FIG. 4 is a three dimensional view of an LED illumination module according to a preferred embodiment of the present invention.
Figure 5:
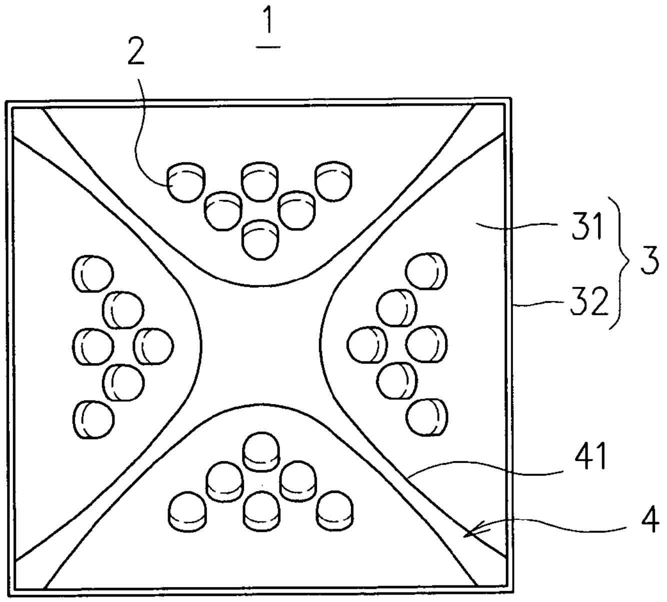
FIG. 5 is a top view of an LED illumination module of FIG. 4.
Figure 6:
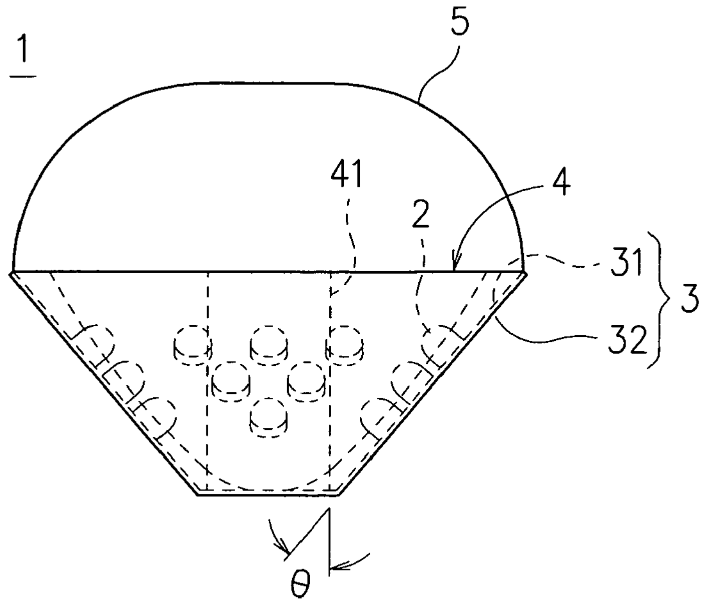
FIG. 6 is a side view of an LED illumination module of FIG. 4.

Please refer to FIG. 4 to FIG. 6, which are schematic diagrams illustrating an LED illumination module according to a preferred embodiment of the present invention. The illumination module 1 is comprises of a plurality of light sources 2, a plurality of light source substrates 3, a plurality of reflecting members 4 and a lens 5. Any one of the plural light source 2 can be a device selected from the group consisting of an LED, a solid-state light source, an incandescent bulb, and a gas discharge lamp. The arrangement and the number of the light sources 2 are dependent on the size of the illumination module 1 and the type of light source 2 being selected. In this preferred embodiment, LEDs are selected as the light sources 2 of the illumination module 1 that are being grouped into a plurality of arrays to be fitted respectively on the light source substrate 3 corresponding thereto. Moreover, the LED using in the illumination module 1 can be a high power white light LED chip, since it is small in size that is suitable to be used as the light source of the present invention.

Each of the plural light source substrates 3 can be made of a material of high thermal conductivity, which can be a metal, such as copper, aluminum, iron, etc., or a semiconductor material, such as silicon, or a composite material, such as ceramics, gels, or the combination thereof. The plural light source substrates 3 are arranged at positions corresponding to each other so as to form the periphery of the illumination module 1, whereas the inner surface 31 of the periphery is enabled for the plural light sources 2 to be fitted thereon and for electric circuits to be formed thereon. Each of the light sources 2 fitted on the inner surface 31 of corresponding light source substrate 3 is electrically connected to a electric circuit corresponding thereto for providing power to the light source 2. It is note that the waste heat generated by the light sources 2 can be dissipated out of the illumination module 1 by way of the light source substrates 3 since they are made of a material of high thermal conductivity. Moreover, the number of the light source substrates 3 is dependent on the size of the illumination module 1 and the type of light source 2 being selected.

Figure 7:
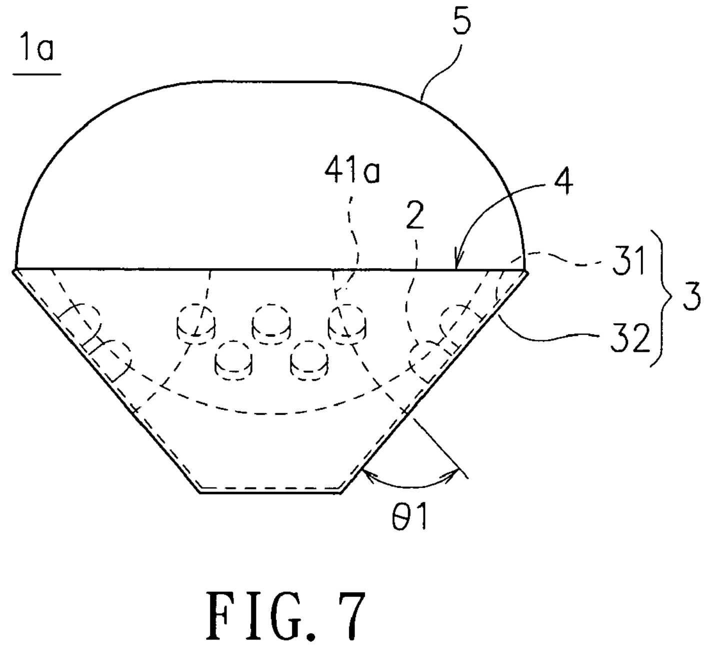
FIG. 7 is a schematic diagram showing the arrangement of the reflecting members of an LED illumination module according to another preferred embodiment of the present invention.

Each reflecting member 4 is placed at the center of the illumination module 1 where it is corresponding to each light source substrate 3 corresponding thereto so as to reflect the light emitting from the light sources 2 fitted on the corresponding light source substrate 3 since each reflecting member 4 is made of a material selected from the group consisting of non-metallic materials having a reflective film coated thereon, such as semiconductor materials, polymer materials, and composite materials; metallic materials with reflecting ability; and the combination thereof. As seen in FIG. 6, the angle θ formed between the inner surface 31 of one of the plural light source substrate 3 and the reflecting surface 41 of a reflecting member 4 corresponding thereto can be obtained by the calculation of an optic software for optimizing the outputted luminous flux of the illumination module 2. Please refer to FIG. 7, which is a schematic diagram showing an arrangement of the reflecting members of an LED illumination module 1*a* whereas the reflecting surface 41*a* of each reflecting member 4 is a concave arc. It is noted that the luminous flux of the illumination module 1*a* is not the same as that of the illumination nodule 1 since the total area of reflecting surfaces 41*a*, the amount of light sources 2 and the angle $\theta_1$ formed between the reflecting surface 41*a* and the corresponding inner surface 31.

In addition, a lens 5 with light refraction ability is disposed at the light-emitting end of the illumination module 1 so as to enable the light illumination module to have light condensing/diffusing capability. In a preferred aspect of the invention, a material of light reflecting ability can be coated on the inner surface 31 of each light source substrate 3, so that the light emitted from the plural light sources 2 is first being reflected by the reflecting surface 41 and the inner surface 31 and then can be discharged out of the illumination module 1 after being refracted by the lens 5, and thus the luminous efficacy of the illumination module 1 is enhanced.

Figure 8:
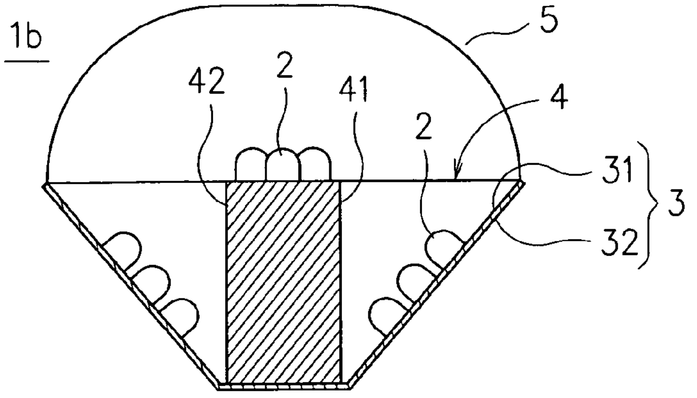
FIG. 8 is a schematic diagram showing an arrangement of a plurality of light sources on corresponding light source substrates according to a preferred embodiment of the present invention.
Figure 9:
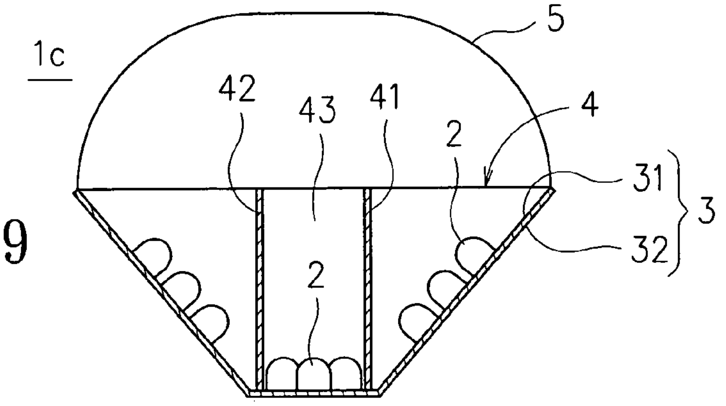
FIG. 9 is a schematic diagram showing an arrangement of a plurality of light sources on corresponding light source substrates according to another preferred embodiment of the present invention.

The plural light sources 2 can be grouped into a plurality of arrays to be fitted respectively on the inner surface 31 of the light source substrate 3 corresponding thereto. The amount and size of the light source substrate 3 can be varied with respect to the type and size of the light source 2 used in the illumination module 1, moreover. The shape of each light source substrate 3 can be triangle, pentagon, or hexagon, and so on, and the amount of the light sources 2 used in the illumination module 1 can be varied with respect to the available space of the illumination module 1. It is noted that a formation of the light sources 2 can be arranged on top of a structure 42 formed of the reflecting members 4 as the illumination module 1*b* shown in FIG. 8; or a formation of the light sources 2 can be arranged on a place 43 inside a hollow structure 42 formed of the reflecting members 4 as the illumination module 1*c* shown in FIG. 9; or a formation of the light sources 2 can be arranged on the light-reflecting surface of a structure formed of the reflecting members 4. However, the arrangement and the amount of the light sources 2 are not limited by the above description that can be varied with respect to the integrated structure formed of the reflecting member 4 and the light source substrates 3. By the integrated structure formed of the reflecting member 4 and the light source substrates 3, the amount of light sources 2 capable of being configured in the illumination module 1 is maximized so that the luminous flux per unit area can be optimized.

Figure 10:
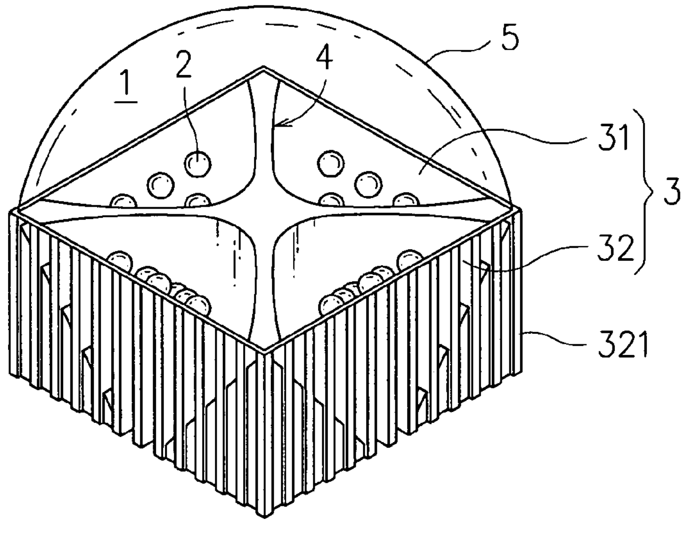
FIG. 10~FIG. 13 are schematic diagrams showing LED illumination modules of different heat dissipating devices according to the present invention.

Please refer to FIG. 10 to FIG. 13, which are schematic diagrams showing LED illumination modules of different heat dissipating devices according to the present invention. The illumination module shown in FIG. 10 is an extension of that shown in FIG. 4 that a plurality of heat dissipating fins 321 are arranged at the outer surface 32 of each light source substrate 3 for increase area of heat dissipating thereof. It is note that the waste heat generated by the light sources 2 can be dissipated out of the illumination module 1 by way of the light source substrates 3 where it is further being conducted to the plural heat dissipating fins 321 formed thereon to be dissipated, since each light source substrate 3 is made of a material of high thermal conductivity. Moreover, the shape of each heat dissipating fin 321 can be formed at will according to actual requirement, which is not limited by the rectangular shown in FIG. 10.

Figure 11:
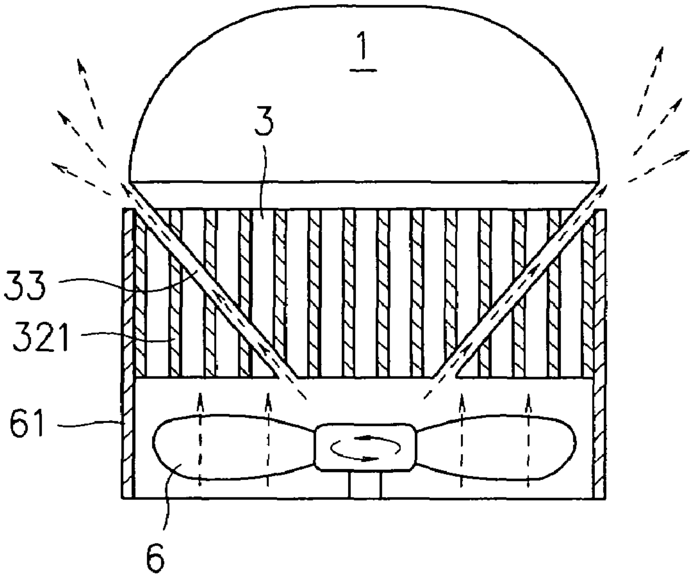

The illumination module shown in FIG. 11 is an extension of that shown in FIG. 10 that a fan 6 is further being installed at the bottom of the illumination module 1. By the wind force generated by the fan 6, a heat convention is induced to occur on the plural heat dissipating fins 321 for reducing the temperature of the light sources 2. Moreover, for enhancing the heat dissipating efficiency, separating plates 61 are arranged, which each can be the portion of a corresponding heat dissipating fin 321 extending out of the edge thereof, or each can be a plate attached onto a selected heat dissipating fin 321, so that the wind force of the fan 6 can be concentrated thereby. In addition, channels 33 are formed between the outer surface of each light source substrate 3 and each heat dissipating fin 321 corresponding thereto for forming a non-closed contact surface therebetween. By the formation of the channels 33, heat can be discharged out of the illumination module 1 rapidly by the heat convention caused by the fan 6.

Figure 12:
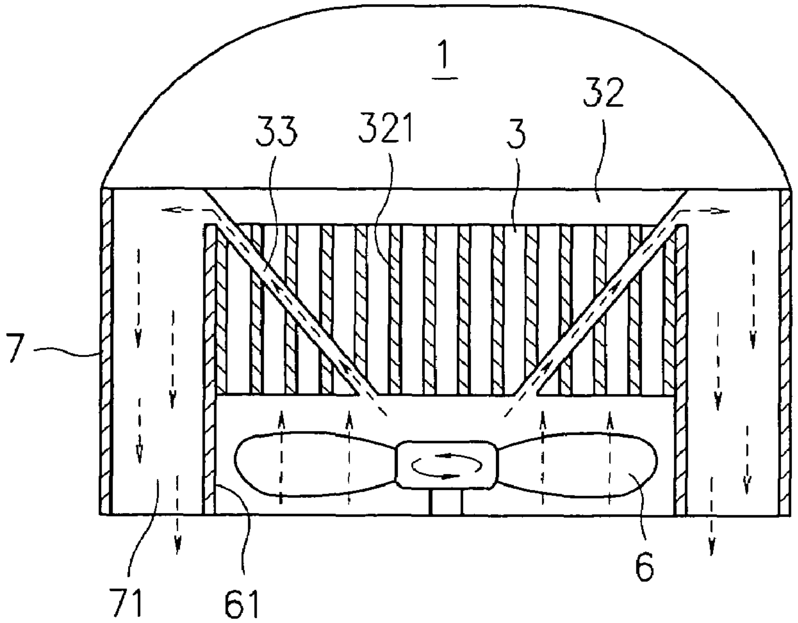

The illumination module shown in FIG. 12 is an extension of that shown in FIG. 11 that a hull 7 is used to cover the illumination module 1. The hull 7 is covering the structure formed by the separating plates 61 while forming a space 71 sandwiched between the separating plates and the hull, the space 71 being connected with the channels 33 arranged between the selected heat dissipating fin 321 and the light source substrate 3 corresponding thereto. The function of the space 71 is to separate and isolate cold air from the hot air inside the illumination module 1 so as to enhancing the convention of the plural heat dissipating fins 321 as the wind force of the fan 6, being concentrated by the separating plates 61, is used to force the hot air to flow into the space 71 by way of the channels 33 and then to be discharged out of the illumination module 1.

Figure 13:
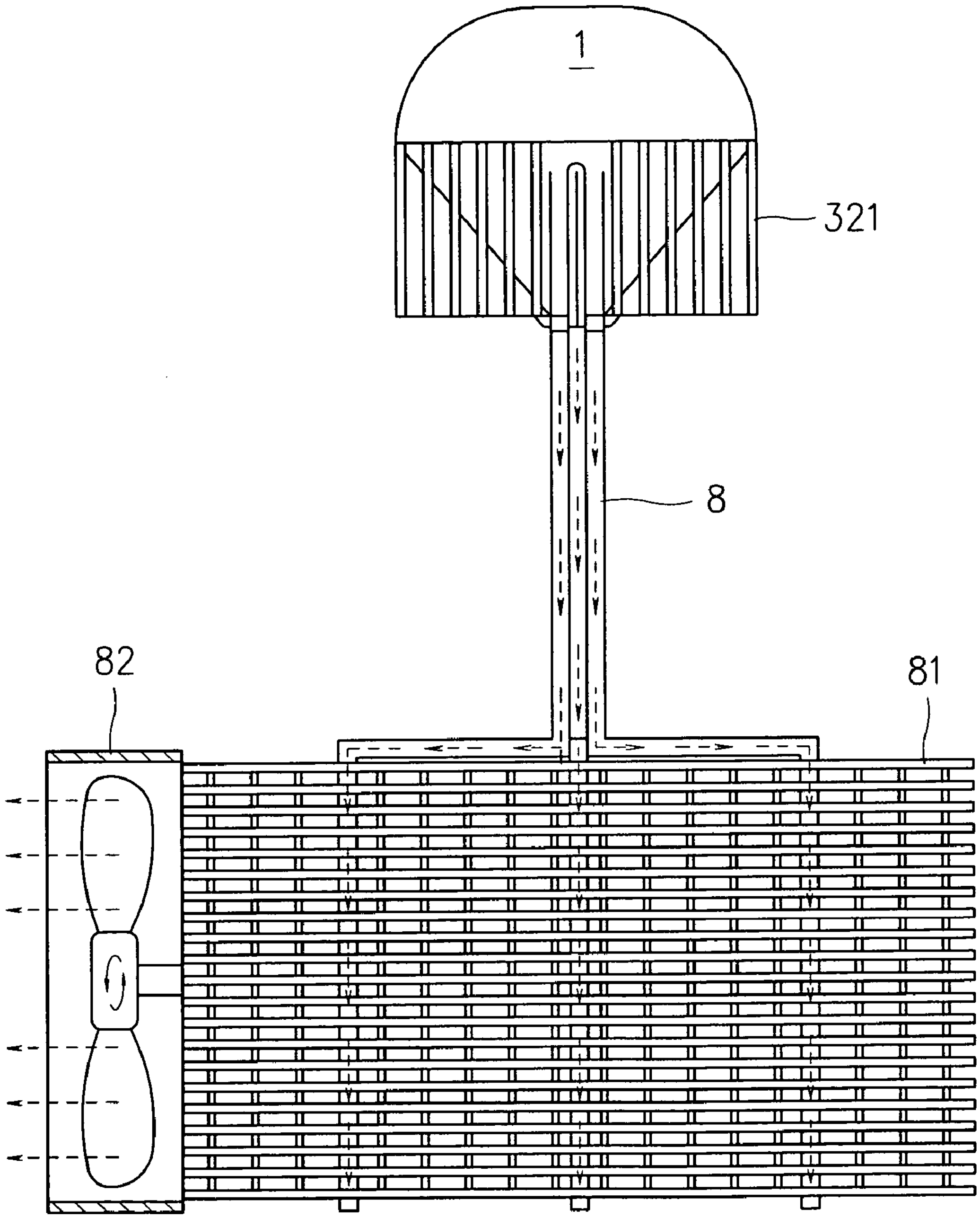

The illumination module shown in FIG. 13 is an extension of that shown in FIG. 10 that a heat pipe device 8 is connected to the heat dissipating fins 321. The cooling agent, such as cold air or coolant, flowing inside the heat pipe device enables the same to conduct the waste heat out of the illumination module 1. In addition, there is at least a posterior heat dissipating fin 81, each being arranged at an end of the corresponding heat pipe device 8 for receiving waste heat guided out by the same; and further, there is at least a posterior fan 82, each being used for forcing a heat convention to occur in the corresponding posterior heat dissipating fin 81.

According to an ASAP analysis of ray tracing perform on the high power illumination module of the invention, the light-emitting efficiency of the illumination module of the invention is 81% since the loss of light caused by interior reflection and absorption is only 19%, whereas the luminous flux is 34% and 71% as detected at circular blocking plates respectively positioned at the 30 degree and 45 degree divergence angle of the illumination module. Accordingly, the illumination module is not only feasible, but also is capable of providing good light-emitting efficiency.

To sum up, the illumination module of the invention is advantageous as following:

(1) While comparing to a conventional illumination module with the same light emitting area as that of the illumination module of the invention, the luminous flux per unit light-emitting area is increased since the amount of light sources capable of being arranged in the illumination module is increase by the three dimensional arrangement of the light source substrates.

(2) While comparing to a conventional illumination module with the same amount of light sources as that of the illumination module of the invention, the density of light sources fitted on a corresponding light source substrate is reduced by the three dimensional arrangement of the light source substrates, and thus enhance the light dissipating ability of the illumination module.

Figure 1:
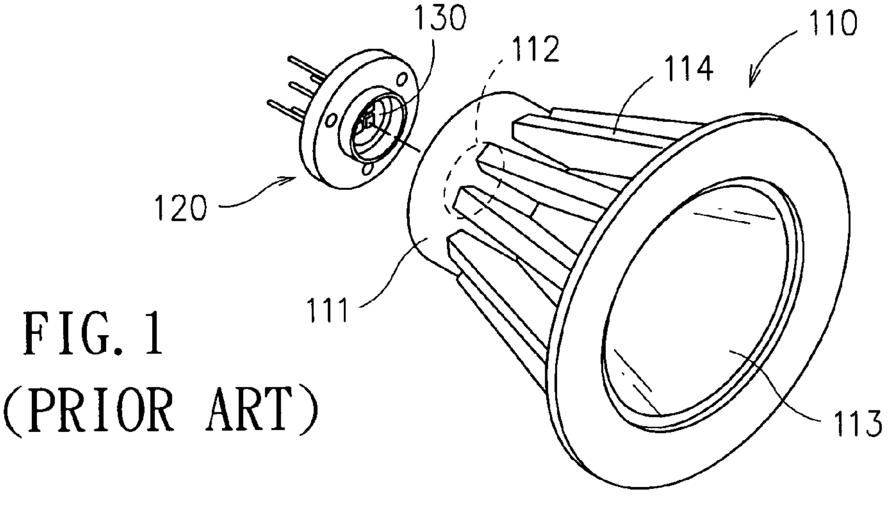
FIG. 1 (PRIOR ART)
FIG. 1 is a schematic view of a conventional high power LED projection lamp disclosed in T.W. Pat. No. M251074.
Figure 2:
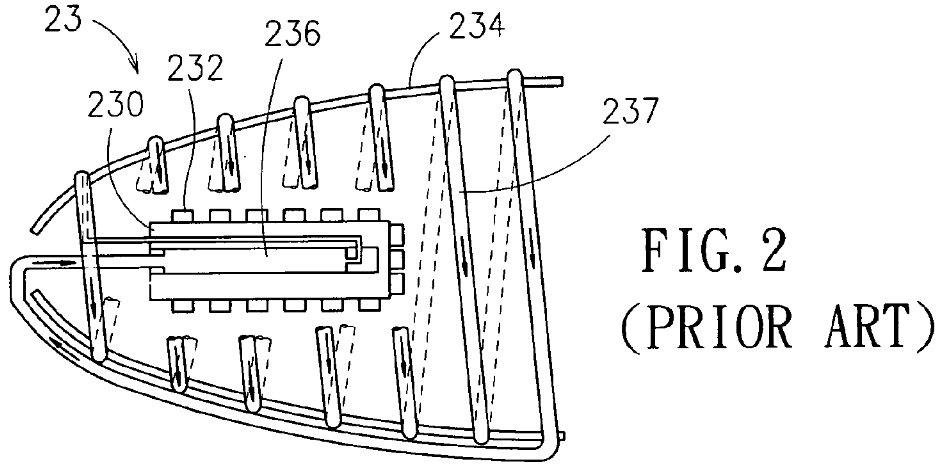
FIG. 2 (PRIOR ART)
FIG. 2 is a schematic view of another conventional LED luminaire disclosed in T.W. Pat. No. I225713.

(3) While comparing to the conventional LED luminaire of FIG. 2 which has the same output power and use the same screen as that of the illumination module of the invention, the cost of fabricating the illumination module of the invention is less than that of the conventional illumination module since the light sources of the invention is fitted directly on the light source substrates for enabling the waste heat generated from the light sources can be guided to the screen with heat dissipating ability, and thus the illumination module can do without the heat pipe device of the conventional illumination module.

Figure 3:
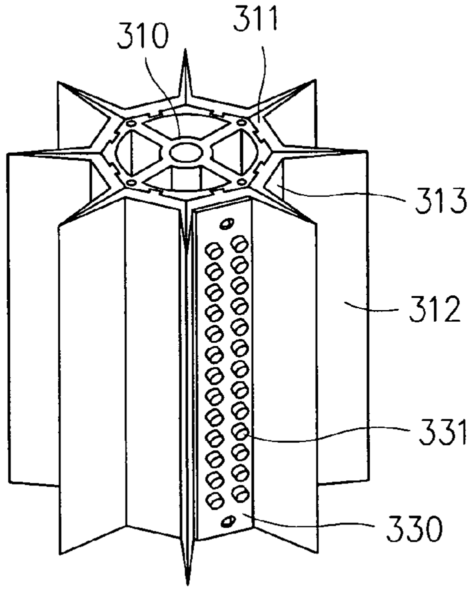
FIG. 3 (PRIOR ART)
FIG. 3 is a schematic view of yet another conventional LED luminaire disclosed in T.W. Pat. No. M248962.

(4) While comparing to the conventional LED luminaire of FIG. 3 which has inward heat-dissipating paths, the heat dissipating fins attached on the light source substrates are capable of providing a better heat dissipating means that has unlimited heat dissipating area.

(5) Not only the luminous flux per unit light emitting area is increased as the overall volume of the illumination module of the present invention is reduced, but also the area of the illumination module that can be used for heat dissipation is increased for enabling the illumination module to be miniaturized and adapted for high power illuminations, such as light source of projectors, flash lights, auto head light, projection lamps, backlight modules, and indoor/outdoor illuminations.

(6) By the specially designed three-dimensional structure formed of the plural light source substrates for enabling heat to be dissipated by the plural heat dissipating fins, or by the convention forced by the fan, or by the conduction of the heat pipe device, the illumination module of the present invention is adaptable to be used as light source of various working power.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An illumination module comprising:

a) a plurality of light sources;

b) at least one light source substrate located on a periphery of the illumination module, the periphery of the illumination module having a polygonal shaped cross-section formed by the at least one light source substrate, an array of light sources being a predetermined number of the plurality of light sources and located on an inner surface of the at least one light source substrate; and c) at least one reflecting member located on a center portion of the illumination module and reflecting lights emitted from the plural light sources, the plurality of light sources are located between a corresponding one of the at least one light source substrate and a corresponding one of the at least one reflecting member and emitting the lights inwardly toward the center portion of the illumination module, wherein a number of the at least one reflecting member is equal to and corresponds with a number of the at least one light source substrate, wherein a lens with a light refraction ability is located on a light emitting end of the illumination module, the illumination module further comprising a fan, the at least one light source substrate includes a plurality of heat dissipating fins located on an outer surface thereof, the fan is located at a bottom of the plurality of heat dissipating fins, wherein the plurality of heat dissipating fins include channels formed adjacent to the outer surface of the at least one light source substrate, the illumination module further comprising:

a) at least one separating plate located on an exterior of selected heat dissipating fins of the plurality of heat dissipating fins; and b) a hull covering a structure formed by the at least one separating plate and forming a space located between the at least one separating plate and the hull, the space communicating with the channels located in the plurality of heat dissipating fins.

2. The illumination module of claim 1, wherein each of the plurality of light sources is a device selected from a group consisting of a light emitting diode, a solid-state light source, an incandescent bulb, and a gas discharge lamp.

3. The illumination module of claim 1, wherein the at least one light source substrate is made of a material of high thermal conductivity.

4. The illumination module of claim 3, wherein the material of high thermal conductivity is a material selected from a group consisting of metals, semiconductor materials, composite materials, and a combination thereof.

5. The illumination module of claim 1, wherein the at least one reflecting member is made of a material selected from a group consisting of non-metallic materials having a reflective film coated thereon, metallic materials with reflecting ability, and the combination thereof.

6. The illumination module of claim 1, wherein the surface of the at least one reflecting member for reflecting light is a vertical plane.

7. The illumination module of claim 1, wherein the surface of the at least one reflecting member for reflecting light is an arc surface.

8. The illumination module of claim 1, further comprising a reflector set of light sources of the plurality of light sources is located on a formation located on a top of a structure formed by the at least one reflecting member.

9. The illumination module of claim 1, further comprising a reflector set of light sources of the plurality of light sources is located on a formation located on a light-reflecting surface of a structure formed by the at least one reflecting member.

10. The illumination module of claim 1, wherein a reflector set of light sources of the plurality of light sources is located in an interior of the at least one reflecting member.

11. The illumination module of claim 1, wherein the at least one light source substrate includes a plurality of heat dissipating fins located on an outer surface thereof.

12. The illumination module of claim 1, wherein the at least one separating plate is a portion of a corresponding heat dissipating fin extending out of the edge thereof.

13. The illumination module of claim 1, further comprising:

a) at least one heat pipe device conducting waste heat out of the illumination module;

b) at least one posterior heat dissipating fin located at an end of a corresponding heat pipe device of the at least one heat pipe device for receiving waste heat guided out by the at least one posterior heat dissipating fin; and c) at least one posterior fan forcing a heat convention to occur in the at least one posterior heat dissipating fin.

* * * * *